W. SYKES.
SYSTEM OF SHIP PROPULSION.
APPLICATION FILED MAY 23, 1919.
1,425,615.
Patented Aug. 15, 1922.
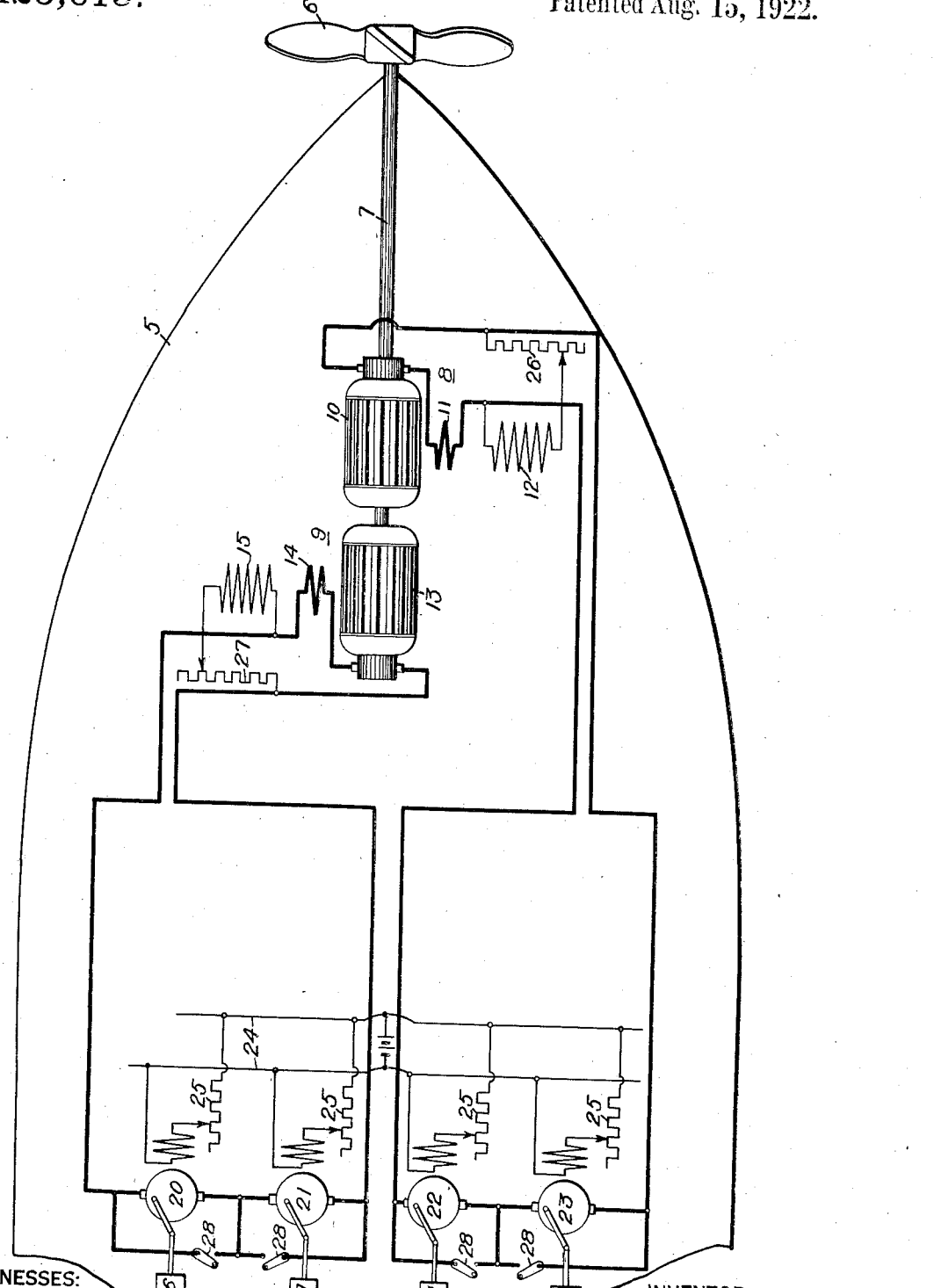
WITNESSES:
J. A. Helsel
D. C. Davis
INVENTOR
Wilfred Sykes.
BY
Wesley G. Carr
ATTORNEY

UNITED STATES PATENT OFFICE.

WILFRED SYKES, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF SHIP PROPULSION.

1,425,615.   Specification of Letters Patent.   Patented Aug. 15, 1922.

Application filed May 23, 1919. Serial No. 299,304.

*To all whom it may concern:*

Be it known that I, WILFRED SYKES, a citizen of the United States, and a resident of Wilkinsburg, in the county of Allegheny and State of Pennsylvania, have invented a new and useful Improvement in Systems of Ship Propulsion, of which the following is a specification.

My invention relates to systems of ship propulsion wherein a plurality of generators, driven, for example, by internal-combustion engines, are employed for the energization of propeller motors, and it has for its object to provide a system of connections whereby the effects of speed variations in the various prime movers are largely eliminated and compensated for, and whereby all parts of the system may, at all times, be caused to bear substantially their proportionate part of the total load.

Not only is my system applicable for use in ship propulsion but it may also be used in all types of installation wherein prime movers of variable-speed characteristics are jointly employed for supplying a common load.

The single figure of the accompanying drawing is a diagrammatic plan view of an after-body of a ship illustrating an arrangement of generating and propulsion units connected in accordance with my invention.

In the propulsion of a ship by internal-combustion engines, it is frequently necessary to employ quite a number of prime movers as, for example, four, in order that single units may be withdrawn for repair without seriously crippling the total propulsive force developed and in order that the individual units be not unduly large and unwieldly in construction. It is quite difficult to cause internal-combustion engines of the naval type to operate at identical speeds because of difficulty of governor adjustment, etc. If prime movers of this character are directly connected to generators, therefore, and if the generators are operated in parallel for the energization of a propulsion motor, extremely undesirable circulating currents may flow between the different generators.

In accordance with the present invention, therefore, I subdivide the propulsion motor as, for example, into two parts and I subdivide the prime movers, with their attendant generators, into two groups, operating the generators in each group in relative series connection for the energization of one-half the propulsion motor. By operating the generators in series, the effect of speed variations and voltage variations in a given generator are largely compensated for and thus the load is, at all times, more uniformly distributed. By designing the two members of the propulsion motor with slightly drooping compound speed characteristic, the load distribution is still further equalized.

Referring to the drawing for a more detailed understanding of my invention, I show the after-body of a ship in plan view at 5, the ship being provided with a single propeller 6 driven by a shaft 7 having a double propulsion motor of the direct-current type embodying a motor unit 8 and a motor unit 9. The unit 8 comprises an armature 10, a series field winding 11 and a shunt winding 12 and, in like manner, the unit 9 comprises an armature 13, a series-field winding 14 and a shunt winding 15. Energy for the operation of the motor units 8 and 9 is supplied by four internal-combustion engines 16, 17, 18 and 19, respectively, coupled to direct-current generators 20, 21, 22 and 23.

The generators 20 and 21 are connected in series relation to energize the motor unit 9 and, in like manner, the generators 22 and 23 are coupled in series relation to energize the motor unit 8. The generators 20 to 23, inclusive, are excited from a suitable exciter bus 24—24, and the field excitations thereof may be adjusted by rheostats 25—25. Each of the motors is shown as further having a series field winding in order that they may have compound operating characteristics to enhance the load equalization.

The shunt field winding 12 of the motor unit 8 may have its energization adjusted by field rheostat 26 and, similarly, the excitation of the shunt winding 15 may be adjusted by a field rheostat 27.

Having thus described the arrangement of a system embodying my invention, the operation thereof is as follows. Upon driving the generators 20-23 at their normal speed, the machines 20 and 21 add their voltages for the energization of the motor unit 9, and the generators 22 and 23 add their voltages for the energization of the motor unit 8. Thus, if any one of the generating units is perceptibly away from its proper speed, the effect thereof on the voltage supplied to the dependent motor is largely absorbed be- cause of the other voltages in the circuit. By so adjusting the windings of the motor units 8 and 9 as to cause these units to have slightly drooping characteristics, it follows that, if the sum of the voltages of the generators 20 and 21 is slightly below the sum of the voltages 22 and 23, corresponding load distribution is automatically effected at the motor units 8 and 9.

If it be desired to withdraw one of the generators 20–23 from service, as for the repair of the corresponding internal-combustion engine, the machine may be cut out, as by a suitable short-circuiting switch 28, and supplying the corresponding motor unit solely with the voltage of the remaining generator in circuit therewith. The corresponding field windings on the remaining generator and its dependent motor unit may then be so adjusted that the motor unit tends to run at the proper speed to supply its proportionate amount of the load, as determined by the restricted generating means connected thereto.

Thus, it will be seen that, by the proposed system, an extremely flexible arrangement of units is provided, load equalization between the different units being automatically attained, under many conditions, and being readily attained by manual adjustment, under other conditions.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a system for the generation and utilization of power, the combination with a single load, of a plurality of motor units for the operation thereof, a still greater number of generating units for supplying the necessary power to said motor units, said generator units being divided into a number of groups corresponding to the number of motor units, and the individual generator units in each group being connected in series-circuit relation with the corresponding motor units.

2. In a system of electrical ship propulsion, the combination with a shaft, of a motor unit coupled thereto, a plurality of variable-voltage generators for the energization of said motor unit, said generators being adapted for independent speed variation, and a series circuit connecting said generators to said motor unit.

3. In a system of electrical ship propulsion, the combination with a shaft, of a motor unit coupled thereto, a plurality of generators for the energization of said unit, internal-combustion engines for driving said generators, respectively, and a series circuit connecting said generators to said motor unit, whereby the effect of relative speed variations among said engines is compensated for.

4. In a system of electrical ship propulsion, the combination with a shaft, of a plurality of motor units coupled thereto, a still greater number of generator units for the energization of said motor units, internal-combustion engines for the operation of said generator units, respectively, said generator units being subdivided into a number of groups corresponding to the number of motor units, and the generator units in each group being connected in series-circuit relation with a given motor unit, respectively.

5. In a system of electrical ship propulsion, the combination with a shaft, of two propulsion motors coupled thereto, each motor being of the direct-current, compound-wound type and having a slightly drooping compound characteristic, a plurality of generators for the energization of said motors, an internal-combustion engine coupled to each generator for the operation thereof, said generators being divided into two groups, and series-circuit connections between one propulsion motor unit and the generators of one group and between the remaining motor propulsion unit and the generators of the remaining group, respectively.

In testimony whereof, I have hereunto subscribed my name this 19th day of May 1919.

WILFRED SYKES.